United States Patent
Wolfgang et al.

(10) Patent No.: US 6,202,979 B1
(45) Date of Patent: Mar. 20, 2001

(54) VALVE

(75) Inventors: Rothe Wolfgang, Windhagen; Dirk Rennecke, Andernach; Rolf Mintgen, Thür, all of (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/391,814

(22) Filed: Sep. 8, 1999

(30) Foreign Application Priority Data

Sep. 15, 1998 (DE) .............................................. 198 42 155

(51) Int. Cl.[7] .................. F16F 9/34; F16K 31/12
(52) U.S. Cl. .............................................................. 251/50
(58) Field of Search ...................... 251/48, 50, 49, 251/117, 54

(56) References Cited

U.S. PATENT DOCUMENTS

| | | | | |
|---|---|---|---|---|
| 2,756,771 | * | 7/1956 | Spencer | 251/50 X |
| 2,918,076 | * | 12/1959 | Dockrell | 251/50 X |
| 4,401,196 | | 8/1983 | Grundei . | |
| 4,878,650 | * | 11/1989 | Daly et al. | 251/50 X |
| 4,957,275 | * | 9/1990 | Homes | 251/50 X |
| 5,123,671 | * | 6/1992 | Driessen et al. | 188/299 X |
| 5,129,488 | * | 7/1992 | Furuya et al. | 188/282 |
| 5,509,512 | * | 4/1996 | Grundei | 188/284 |
| 5,529,154 | * | 6/1996 | Tanaka | 188/322.15 |
| 5,560,456 | | 10/1996 | Koch et al. . | |
| 5,630,485 | * | 5/1997 | Beck | 188/322.14 |
| 5,779,007 | * | 7/1998 | Wariner | 188/289 |

FOREIGN PATENT DOCUMENTS

| | | |
|---|---|---|
| 27 27 407 | 1/1979 | (DE) . |
| 810836 | 3/1959 | (GB) . |
| 1237487 | 6/1971 | (GB) . |
| 2160950 | 1/1986 | (GB) . |
| 2 163 829 | 3/1986 | (GB) . |
| 2233069 | 1/1991 | (GB) . |
| 58-146167 | 10/1983 | (JP) . |
| 60-192102 | 9/1985 | (JP) . |
| 2-54977 | 4/1990 | (JP) . |
| 4-343109 | 11/1992 | (JP) . |
| 6-43436 | 6/1994 | (JP) . |
| 7-180422 | 7/1995 | (JP) . |
| 9-32942 | 2/1997 | (JP) . |
| 10-19075 | 1/1998 | (JP) . |

* cited by examiner

Primary Examiner—Kevin Shaver
Assistant Examiner—Eric Keasel
(74) Attorney, Agent, or Firm—Baker Botts L.L.P.

(57) ABSTRACT

A valve that influences flow through a fluid connection includes a valve member that executes a motion in which the distance between a valve seat surface and the valve member varies. The valve member is in operative engagement with a damping arrangement that counteracts its motion.

14 Claims, 6 Drawing Sheets

VALVE

BACKGROUND OF THE INVENTION

The present invention relates to a valve that influences flow through a fluid connection and includes a valve member that executes a motion in response to a pressure difference across the valve member and in which the distance between a valve seat and the valve member varies as a function of the pressure difference.

A basic problem with a valve of the type referred to above is that flow or switching noises occur. Quieting channels, which prevent a sudden pressure difference between inflow and outflow sides, have been introduced for damping valves.

In addition, it is known that in damping valves the switching operation is performed only when there is a reduction in pressure below a maximum pressure in the vibration damper, since otherwise switching noises are also noticeable. In this connection, steps have also been undertaken to limit the operating stroke of the valve member, so that no switching noises can occur.

BRIEF SUMMARY OF THE INVENTION

The object of the present invention is to provide a valve that produces the lowest possible shifting noises, has low internal friction, and executes a prescribed operating motion under all operating conditions.

According to the invention, this object is accomplished by damping the movement of the valve member relative to the valve seat. The damping prevents too rapid an opening motion of the valve, which on the one hand may produce flow noises of the flow medium or else switching noises because of the mass of the valve member.

In an advantageous embodiment, the damping means operates speed-dependently. Because of that, a direct dependence exists between the back pressure as an operating force and the countermeasure of the damping means, which likewise operates speed-dependently. Complicated electronics that could provide the same effect are not needed.

For this purpose the speed-dependent damping has a displacer, which is movable in a damping chamber filled with a pressure medium. The same medium that also flows through the valve serves as the pressure medium.

In addition, the damping means has at least one throttle cross section. A plurality of throttle cross sections may alternatively be used, so that a stroke-dependent damping effect becomes possible. In an additional advantageous arrangement, the damping chamber is defined by a cup-shaped housing in which the displacer is received.

The throttle cross section of the damping means is made relatively small. So that the slot between the displacer and the housing exerts no influence on the damping action, the displacer is sealed off from the damping chamber.

In an advantageous arrangement, the valve member is axially movable and is supported by a slide in its operating motion, the slide forming a structural unit with the displacer.

For simplicity of production, the damping chamber has a stepped inner contour, where a longitudinal section of the damping chamber represents a track for the displacer. Hence it is not necessary for the entire inner wall of the damping chamber to be produced with great accuracy.

As an additional measure for influencing the operating motion of the valve member, the damping chamber accommodates a catch arrangement, consisting of catch element and a countercatch element. The catch element is operatively associated with the valve member and defines at least one operating position of the valve member. The catch arrangement may include radially movable supports for a plurality of catch elements that engage in a countercatch element. For simple assembly, the catch elements are parts of a structural unit associated with the slide. In practice, the catch elements are provided on a tubular extension of the slide, the extension having axial slots that permit radial freedom of motion of the catch elements.

In order to define the closing position of the valve, the slide is preloaded by a locking spring arranged within the damping chamber.

To improve guidance of the valve member, the valve member comprises a valve slide which, within the fluid connection, together with a housing of the valve, forms a back-pressure region, the back-pressure region being sealed off by a seal that is radially movable within limits. In order to minimize the problem of friction in connection with the operating motion of the valve member, the seal is held in a groove, the seal being spaced apart from the groove bottom. There is only little preloading of the seal in the back-pressure region. The actual sealing action is produced by the preload of the back pressure.

In order to prevent back pressure upon a travel-in motion of the valve slide, the back-pressure region has a pressure-equalizing connection. To save installation space, the pressure-equalizing connection is arranged in the valve slide.

In addition, the pressure-equalizing space has an additional pressure-equalizing connection, which is controlled by a sealing unit that seals off the housing of the valve, where the housing separates two working spaces from one another and in operation of the valve is moved axially, while the sealing unit has a first outer sealing ring that is designed for low friction and an inner sealing ring that preloads the outer sealing ring radially and, as a function of its position within an annular groove in the housing, controls the additional pressure-equalizing connection.

The back-pressure region has an additional pressure-equalizing connection in the valve slide which, independently of other pressure-equalizing connections, connects the back-pressure region with a working space. Thus, a maximum of three pressure-equalizing connections is available, so that reliable valve slide motion is possible even in the event of malfunction of one of the pressure-equalizing connections.

DESCRIPTION OF THE DRAWINGS

For a more complete understanding of the present invention, and the advantages thereof, reference may be made to the following written description of exemplary embodiments, taken in conjunction with the accompanying drawings.

DESCRIPTION OF THE EMBODIMENTS

Figure 1:
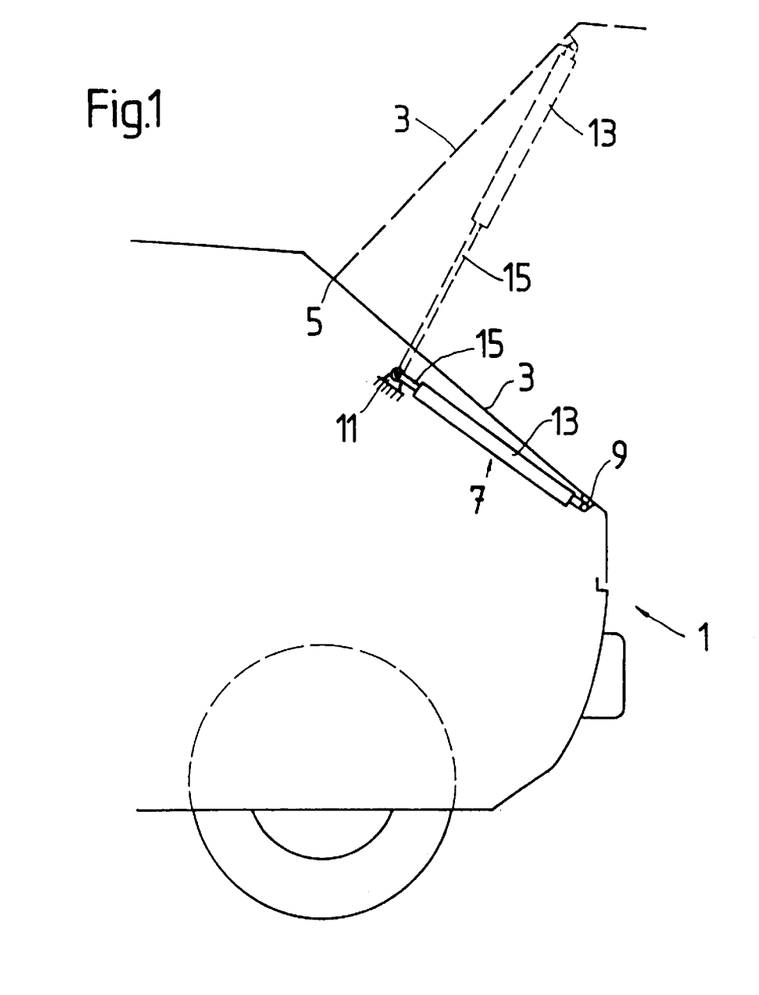
FIG. 1 shows an exemplary installation of a device that incorporates a valve embodying the present invention.

FIG. 1 shows, schematically, a motor vehicle 1 with a vehicle tailgate 3, which is arranged to open and close by pivoting about a pivot axis 5 aligned transversely to the longitudinal axis of the vehicle. To assist the opening motion, a piston-cylinder unit 7 is interposed between the body of the vehicle and the tailgate, the unit being mounted for articulation relative to the body and the tailgate by connecting members 9 and 11. The piston-cylinder unit comprises a cylinder 13 and a piston rod 15 movable axially therein, and a structural member that engages the body of the vehicle and a structural member that engages the tailgate in each instance, so that motion of the tailgate proceeds synchronously with a travel-in or travel-out motion of the piston rod. Use of the piston-cylinder unit is not limited only to tailgates; the unit has other applications, such as vehicle doors.

The piston cylinder unit 7 is shown in FIGS. 2*a* to 2*d*, FIGS. 2*b* to 2*d* showing the piston part of the piston-cylinder unit 7, which incorporates a valve according to the present invention.

Figure 2A:
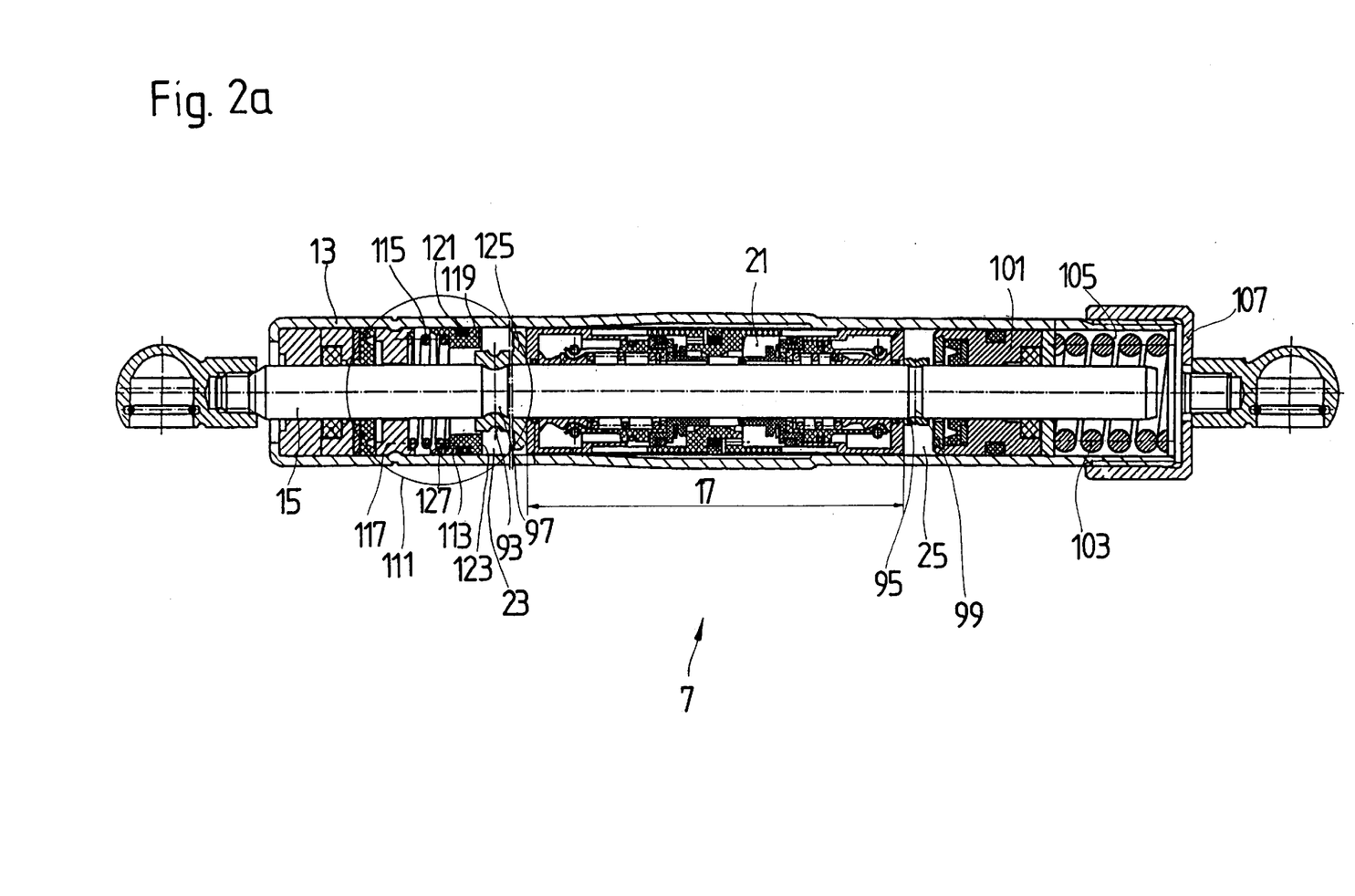
FIGS. 2a–2d show a first embodiment of the invention in axial cross section.
Figure 2B:
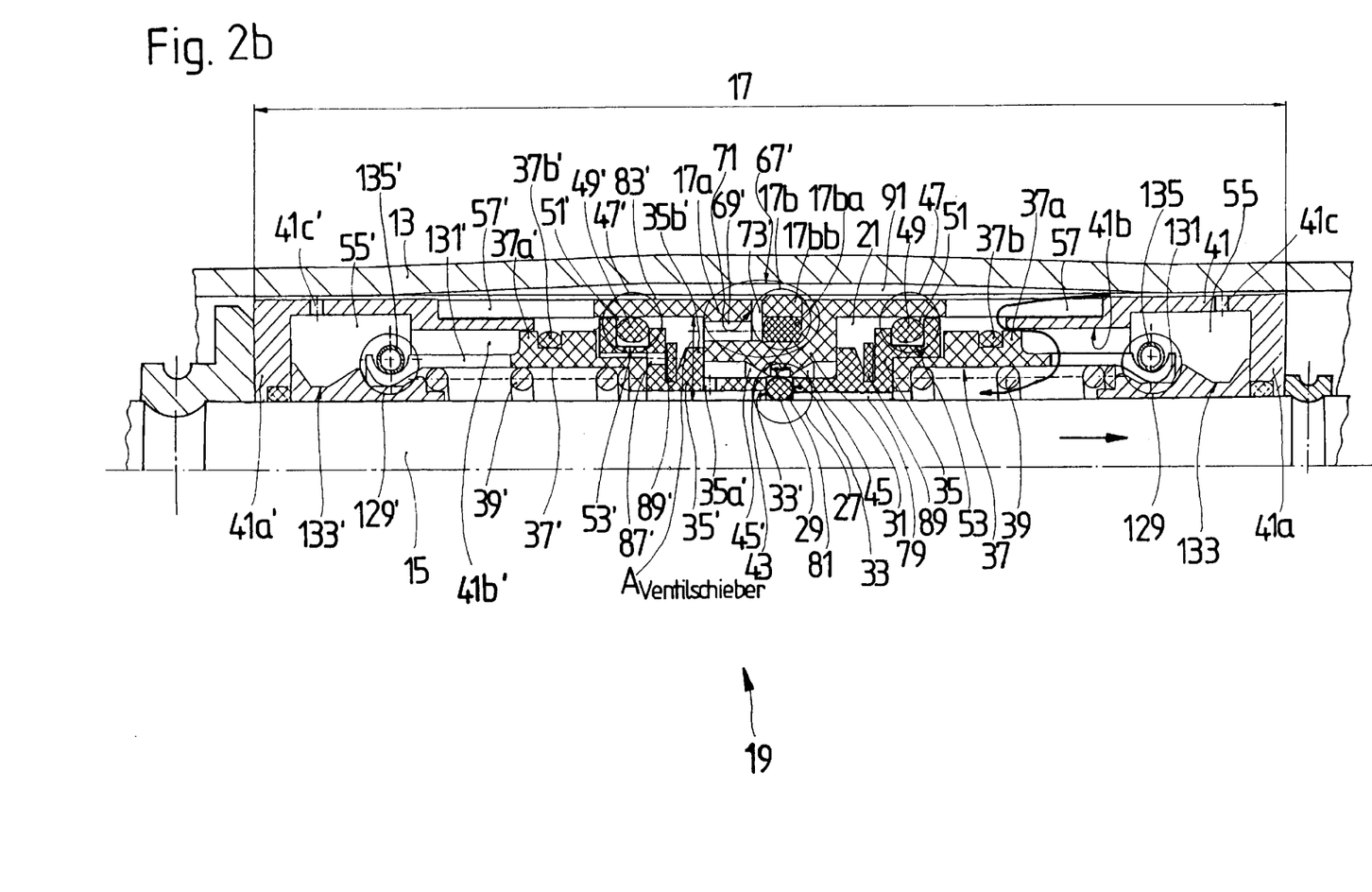

FIGS. 2*a* and 2*b* should be referred to in conjunction with the following description. The piston 17 forms the housing for a valve 19 that permits stepless hydraulic blocking of the piston-cylinder unit 7, in that fluid flow between the working spaces 23 and 25 separated by the piston by a piston ring 17*b* can be permitted or prevented by opening and closing of the valve. The valve has a first closing valve 27, which has a valve member 29, hereinafter called the valve closing member 29, that is a ring and is interposed between the piston rod 15 and a valve casing 31, which forms a section of the piston body, and is movable axially relative to the piston rod and the valve casing. The valve closing member 29 resides between two supporting surfaces 33 and 33' of valve slides 35 and 35'. The valve slides are arranged for axial movement on the piston rod 15 and, with interposition of slides 37*a* and 37', are axially preloaded toward the valve closing member 29 by locking springs 39 and 39'. The locking springs in turn are supported on end flanges 41*a* and 41*a*', which are parts of a housing 41 that forms a damping chamber 55. The housing 41 has adjacent each end flange a stepped inner contour that forms tracks or guideways 41*b* and 41*b*' for displacers 37*a* and 37*a*'. Each displacer 37*a*; 37*a*' is functionally a part of the slide 37; 37'. At least one throttle cross section in the form of an orifice 41*c*; 41*c*' is provided at each end of the housing near each end flange 41; 41'. A plurality of throttle cross sections may be provided, which are effective as a function of the stroke position of the displacer 37*a*; 37*a*'. Alternatively, when there is sufficient installation space the throttle cross section may optionally be provided in the displacer. The displacer 37*a*; 37*a*' is sealed off from the damping chamber 55, 55' by an annular seal 37*b*; 37*b*', so that leakage currents cannot influence the damping action.

A catch mechanism 129; 129', which consists of a catch element 131, 131' and countercatch element 133, 133', is arranged within the damping chamber. Each catch element 129, 129' is in operative engagement with the first valve closing member 29 via the slide 37, 37' and consist of radially movable supporting means in the form of fingers separated by slots, the ends of which engage in a catch groove of the countercatch element 129; 129'. In the present embodiment the catch element, the slide and the displacer are operatively one structural unit. In addition to the inherent load of the supporting element (constituted by the plurality of fingers), an annular spring 135; 135' provides for a radial preloading force between the supporting element and the respective catch step, of which there are at least two in each countercatch element 129; 129'. Alternatively, the locking spring 39, 39' may optionally be arranged between the housing end flanges 41; 41' and the supporting element, if the conditions of the installation space permit.

It is apparent from the drawings and the foregoing description that the valve 19 is substantially symmetrical with respect to the valve closing member 29, so that a blocking function is possible for both directions of flow through the fluid connection 21. In order not to crowd the figures with reference numerals, some reference numerals are entered in only one half of the valve.

FIG. 2*b* shows the valve in the blocking position. The two working spaces 23; 25 (see FIG. 2*a*) have the same operating pressure. The valve closing member 29 of the first closing valve 27 is located in the center part of the valve casing 31, where a radially inwardly projecting protuberance forms a sealing surface region or seat 43 for the valve closing member 29. Starting from the sealing surface region a throttle means 45; 45' adjoins a flow-off side of the first closing valve 27. The throttle means consists of a plurality of grooves 45, 45' that taper radially outwardly along their length away from the seat 43 in order to progressively present a greater cross sectional area for fluid flow with increasing displacement of the valve closing member 29 away from the seat 43.

The valve 19 has, in addition to the first closing valve 27, two second closing valves 47 and 47' which are arranged, respectively, in series with the first closing valve 27; each second closing valve 47; 47' only opens when the first closing valve is already opened to flow. The second closing vale 47; 47' also has a valve closing member 49, 49', which is a radially elastic seal. The elastic seal is held in a groove 51; 51' and can be deformed radially all the way to a groove bottom 53; 53' of the valve slide 35; 35' of the second closing valve 47; 47'. Thus the second valve closing member 49; 49' has only very small preloading, so that only a very small frictional force results from the valve closing member 49; 49'.

A throttle means, which consists of slots 57; 57' in the tubular member 17*a* of the piston, is also connected on the outflow side downstream of the second closing valve 47; 47'. This is intended to prevent the full back pressure that acts on the second closing valve from flowing unhindered through the second closing valve 47; 47' and causing noise.

For reasons of operating comfort, a stepped valve release force is to be employed in the valve 19. For this purpose, pressure-impacted surfaces unlike in size are provided on the first closing valve 27, on the one hand, and the respective second closing valves 47; 47' on the other hand. In the first closing valve 27 the pressure-impacted surface is the cross-sectional area of the first valve closing member 29, hereinafter called $A_{Ring}$. Each second closing valve 47; 47' has a substantially greater pressure-impacted surface, which results from the ring-shaped area within the region of engagement of the valve slide 35; 35' with the valve closing member 49; 49', hereinafter called $A_{Ventilschieber}$. The surface $A_{Ventilschieber}$ is distinctly greater, so that the effective forces holding the second closing valve open are higher by a multiple of the actuating forces on the first closing valve, while the actuating forces need be applied for only a brief moment, resulting in comfortable use.

The opening forces are determined not only by the locking spring 39; 39', but also by the catch mechanism 129; 129'.

A basic problem with valve slides always exists when they are moved into or out of a cavity of a fluid connection 21. The production of back pressure or underpressure that inhibits the motion of a valve slide should be avoided. Therefore the valve mechanism 19 has a check valve 67; 67', which turns a pressure-equalizing connection 69; 69' on or off. The check valve is formed by the piston ring 17b of the piston, which separates the two working spaces 23; 25 hydraulically. The piston ring is guided within a piston ring groove 71, and the piston ring groove has a switch path 73; 73' into which the pressure-equalizing connections 69; 69' open. The piston ring 17b is to be viewed as a sealing unit that consists of an inner sealing and preloading ring 17ba and an outer sealing and slide ring 17bb. The outer slide ring 17bb is in principle designed with a small coefficient of friction with the cylinder 13 and may consist, for example, of TEFLON®. In contrast to this, the inner preloading ring is made of an elastomer.

An additional pressure-equalizing connection 87; 87', which is provided in the valve slide 35; 35' and has a check valve in the form of a tilting disk 89; 89' opening toward the fluid connection 21, 21', which disk is shifted between two limiting means on the valve slide by pressure-impacting, serves as an additional measure for the function of "prevention of underpressure in the fluid connection 21, 21'."

In the rest position the first closing valve 27 and the two second closing valves 47; 47', as well as the check valves with the tilting disk 89; 89', are closed between the fluid connection 21; 21' and the working spaces 23; 25. The first pressure-equalizing connection 69; 69', which is operated by the piston ring, is open in the rest position.

Upon a motion of the piston rod in the direction of the arrow (to the right in FIG. 2b) the medium flows out of the working space 25 (see FIG. 2a) mainly to the valve slide 35. The entering medium is deflected in the direction of the inside diameter of the slide 35 and passed on by means of longitudinal channels 79 in the direction of the first closing valve 27. On the slide 35 the face 33 turned toward the valve closing member 29 of the first closing valve 27 is oblique, so that the closing member assumes a defined operating position, but on the other side an annular chamber 81 is present, in which a back pressure can build up and axially displace the valve closing member 29 of the first closing valve 27.

Figure 2C:
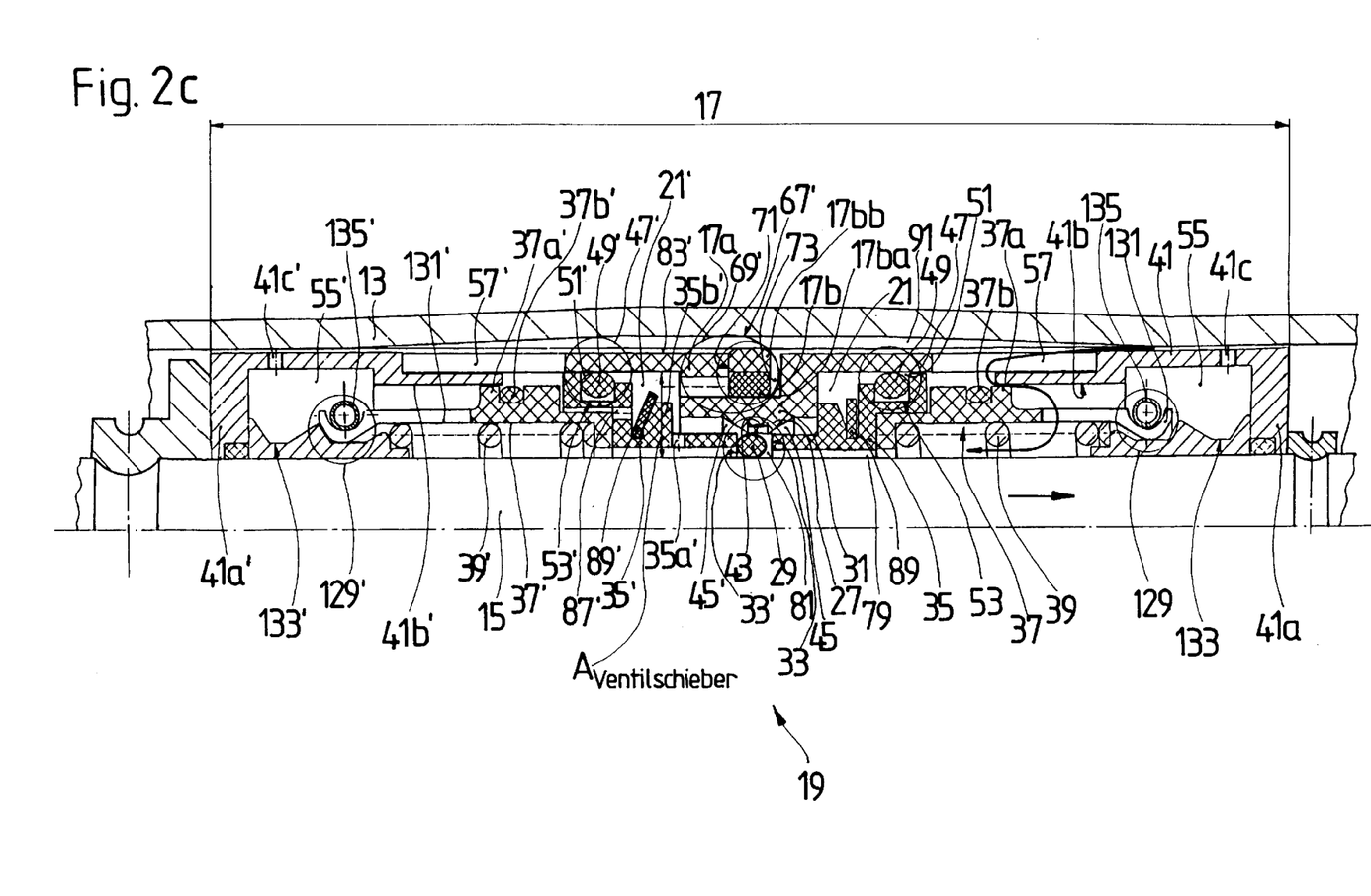

At the beginning of the opening motion of the first closing valve 27 and the second closing valve 47, the situation as seen in FIG. 2c is established. Some of the medium flows into the slot 83' between the tubular member 17a and the cylinder 13 as far as the piston ring 17b. The operating path 71 between the sealing unit and the sealing groove is closed. At the moment when the piston ring 17b has closed the pressure-relief connections 69' but the valve closing member 29' of the first closing valve 27 has not yet reached the grooves 45' after the valve sealing region 43, an underpressure would build up in the fluid connection 21. This underpressure would be disadvantageous to the opening behavior of the second closing valve 47'. Therefore, the check valve 87'; 89' of the additional pressure-equalizing connection 89' opens at this moment and allows medium to flow from the working space 23 into the fluid connection 21'. As soon as the first closing valve 27 allows the passage of medium, the back pressure in the fluid connection 21', because of the unlike size of the pressure-impacted surfaces, again closes the check valve 87'; 89'. At the same time, it is irrelevant to the function of the left-hand second closing valve 47' whether the check valve on the right-hand valve slide 35 is open or closed.

When the first closing valve 27 is open, the medium flowing through the grooves 45' in the tubular member 17a into the fluid connection 21 can build up a second smaller back pressure on the second closing valve 47'. No significant leakage occurs. The second valve closing member 49', which is in clearance from the groove bottom 53', is then hydraulically preloaded axially against the left-hand groove side wall and against the inner wall of the tubular member 17a. The back pressure operative on the pressure-impacted surface $A_{Ventilschieber}$ moves the valve slide 35' against the force of the locking spring 39' and the catch arrangement 129' together with the valve closing member 49' into the region of the slot 57'. With this the second closing valve 47' also opens, while an additional reduction of pressure is effected by the slot 57', which serves as a throttle means, in order to prevent any excessively great pressure jumps and hence noise.

Figure 2D:
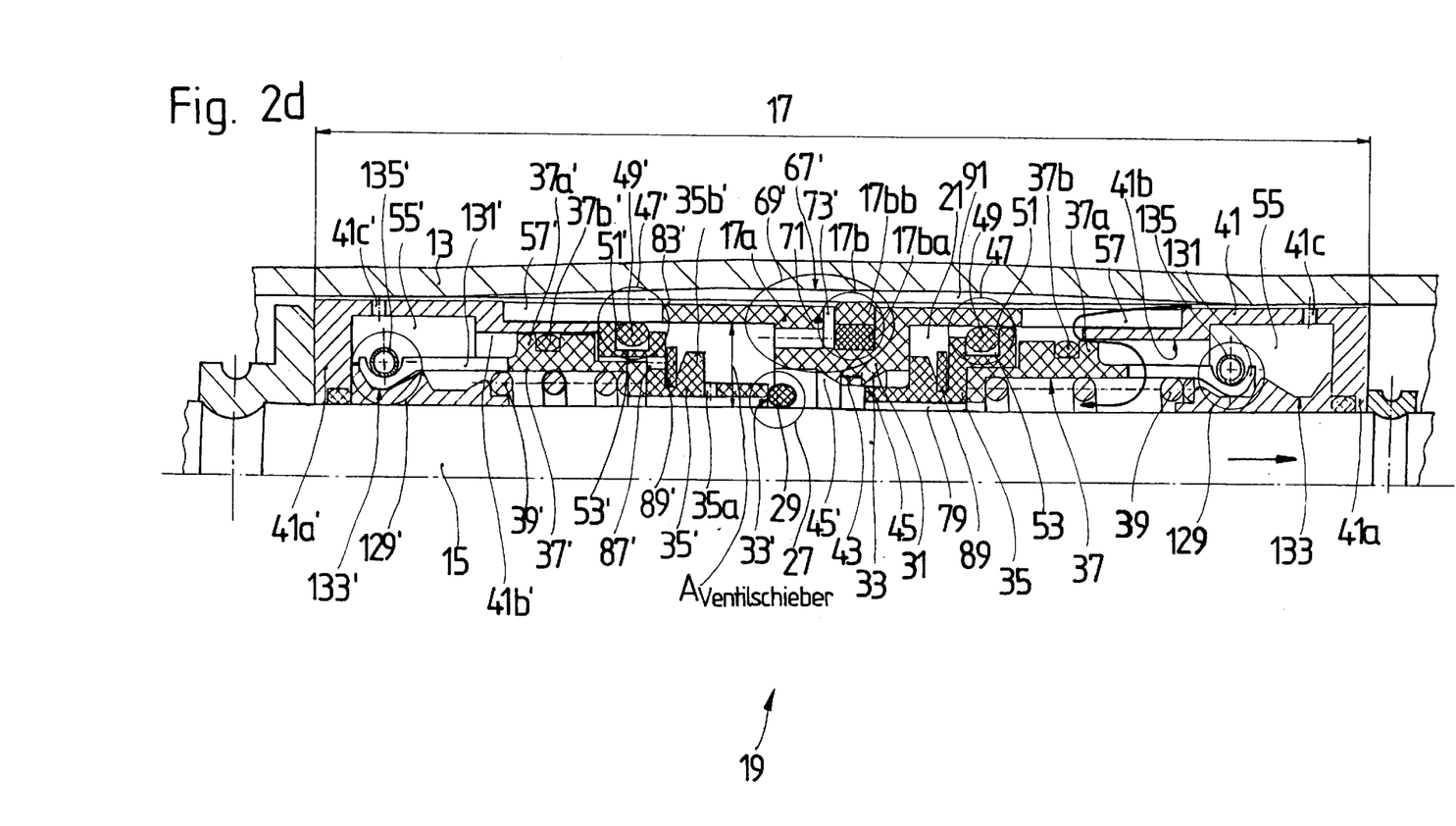

The displacement path of the slide 37' and the valve slide 35' leads, against the holding force of the catch arrangement 129', to a motion of the displacer 37a' of the slide 37' into the damping chamber 55'. The medium located in the damping chamber is displaced through the throttle cross sections 41c', which results in a dynamic pressure force that counteracts the operating motion of the slide 37' and hence the first and second valve closing members 29; 49'. Damping that prevents too rapid an opening motion of the valve slide 35' and hence the generation of noise is produced as a function of the magnitude of the back pressure (FIG. 2d).

When the piston rod 15 is no longer moved, the back pressure on the second closing valve 47' also declines, until the force of the locking spring 39' is greater than the opening force of the back pressure and the holding force of the catch arrangement 129', whereupon the supporting means of the catch means 131' execute a radial widening motion and are carried over into the first catch position. The check valve 87; 89' of the second pressure-relieving connection 89' is thereby closed, whereas the first pressure-relieving connection 69' with the check valve formed by the piston ring 17b is open, so that the valve slide 35' can travel controlled into the fluid connection 21', until the rest position is again assumed. In addition, a third pressure-equalizing connection 35a', which is provided radially in the valve slide, as near as possible to a shoulder 35b' of the valve slide 35', becomes operative. The third pressure-equalizing connection connects the fluid connection 21 by way of the longitudinal channel 79 with the damping chamber 55', which in turn is connected through the at least one throttle cross section 31c' with the working space 25. In this way no undesirable back pressure can become confined in the fluid connection 21.

Since the two valve slides 35; 35' are identical, blocking after a piston-rod motion in the opposite direction is to be understood as occurring with the right-hand second closing valve 47 in exactly the same way as already described. However, unlike spring forces may be provided for the locking springs 39; 39', in order to adapt the necessary back-pressure forces to the requirements.

There are applications in which the blocking function in a given region is probably not utilized. For this, the cylinder has at least one bypass groove 91 or an increased diameter, which permit a connection between the two working spaces 23; 25 regardless of the operating position of the valve 19.

The following description refers to FIG. 2a. The whole piston 17, with its internal parts, may be preassembled as a structural unit independent of the piston rod 13. Fastening of the piston is effected through annular retaining elements 93; 95, which are in each instance brought into the region of a groove 97; 99 on the piston rod 15. The piston is aligned between the two grooves in the piston rod. When the desired position of the piston has been assumed, the two retaining elements are pressed into a form-locking connection with the respective grooves. The axial position of the piston is thus fixed.

It must be considered that in case of an accident, for example, the blocking function of the valve mechanism, for some reason, cannot be released. Therefore the retaining element 95, which for example assumes support when the tailgate must be opened, would tear off, when a tear-away force above the acceptable actuating force is introduced. In this specific example the retaining element 95 is between the piston 17 and a separating piston 101.

The separating piston 101 is preloaded by a compression spring 103. However, it is quite reasonable if the space 105 between the separating piston and a floor 107 of the piston-cylinder unit is preloaded with a compressed gas, so that an operating pressure that moves the piston rod in the travel-out direction acts on a face of the piston rod.

In addition to the valve 19, the piston-cylinder unit 7 has a mechanical-hydraulic pressure limit stop 111, which has a stop sleeve 113 that is supported by way of a pressure stop spring 115 on a piston-rod guide unit 117.

The stop sleeve has a surrounding flange 119, in which a sealing ring 121 that seals off a slot between the stop sleeve 113 and the cylinder 13 is inserted. The inner wall of the stop sleeve is stepped, and a face 123 comes into contact with a flange 125 of the retaining element 93 from the point of insertion of the pressure stop 111.

The diameter of the step of the ingoing side of the stop sleeve is designed in relation to the diameter of the retaining element 93 in such fashion that no significant throttling takes place. Actual throttling is achieved by a damping opening 127 in the stop sleeve. This damping opening connects the back of the stop sleeve with the inflow side in the piston 17.

The representation of 2a is compressed with regard to the structural length of the piston-cylinder unit. The pressure stop naturally is not attached directly to the bypass groove 91. The distance between the bypass groove and the point of insertion of the pressure stop must be adapted to the respective application.

In a piston-rod motion in which the working space 23 becomes smaller, the retaining element 93 moves from a defined stroke position into the stepped inner wall at a nearly constant speed. The medium found in the working space 23, generally, as already described, a hydraulic fluid, is able to flow through the open valves 27; 47 of the piston. As soon as the face 125 of the retaining element 93 rests on the face 123, a damping force, which reduces the speed of the piston, builds up because of the damping opening 127. The flange 125 and the shoulder surface then form an at least dynamically active seal. Thus the damping action is specifically determined solely by the cross section of the damping opening.

Fluid is able to continue to flow into the piston, since at the point of insertion of the pressure stop 111 a distance is still present between the end flange 41a' and the stop sleeve 113.

With decreasing speed of motion of the piston the velocity of flow of fluid through the piston and hence the back pressures on the valves 27; 47; 47' is reduced. If the back pressures fall below a threshold value, the valves 27; 47; 47' go into the blocking position (see FIG. 2b). The piston, the piston rod and hence the tailgate (or door) of the vehicle also necessarily come to a standstill, and the entire process proceeds not abruptly but, owing to the damping effect of the damping opening, continuously so that the introduction of force into the vehicle body has a reliably manageable level. The valves 27; 47; 47' when in blocking position also prevent the tailgate of the vehicle from springing back. In this connection, it should be pointed out that the spring force of the pressure stop spring 115 is so small that the pressure stop can only be moved back into its starting position against the frictional forces between the seal 121 and the cylinder 13, but cannot exert any significant force on the piston rod.

Figure 3:
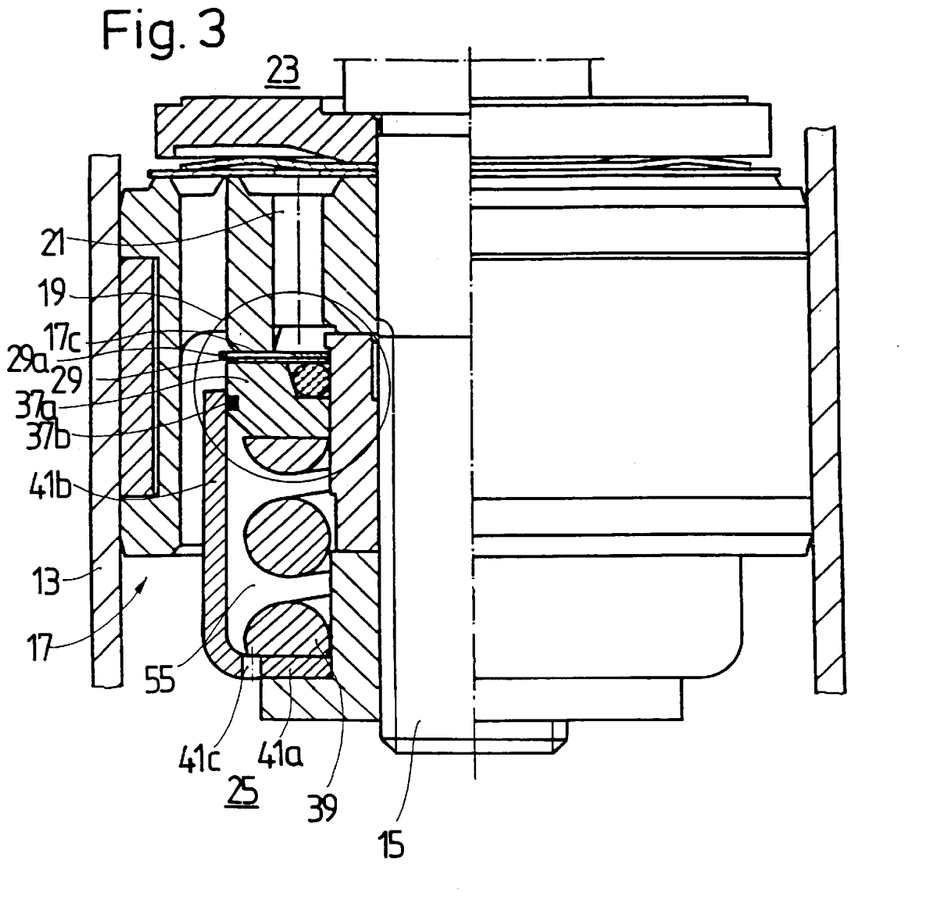
FIG. 3 is an axial cross-sectional view of a damping piston, which includes a second exemplary embodiment of the present invention.

FIG. 3 shows a piston 17 of a vibration damper, as it is used, for example, in a motor vehicle chassis and is of a basic construction, as is disclosed in GB 2 163 829 A.

Functionally like parts shown in FIG. 3 have been given the reference numerals according to FIGS. 2a to 2d.

Upon a piston-rod motion in the direction of the working space 23, damping medium flows into the fluid connection 21 and strikes a valve member in the form of at least one valve disk. A small preliminary opening cross section 29a is operational at low flow velocities. At greater velocities, the valve member lifts away from a valve seat surface 17c of the piston. Depending upon the design of the displacer in relationship to the housing 41, the displacer 37a is inserted into the damping chamber 55, owing to which the operating motion of the valve closing member 29 is slowed down. The valve closing member 29 is capable of lifting just so far from the valve seat surface, but the lift-off speed is limited. The spring force of the locking spring 39 could be reduced and the damping action of the damping chamber used in designing the piston valve.

What is claimed is:

1. A valve for controlling flow through a fluid connection, comprising a housing having a portion forming a damping chamber that is filled with a fluid and has a throttling outlet opening, a valve member received in the housing and movable relative to a valve seat in the housing, a displacer movably received in the damping chamber, operatively associated with the valve member and biased relative to the housing such as to tend to close the valve, and a resilient releasable catch arrangement acting between the housing and the displacer and having catch elements and counter-catch elements which when engaged define at least two positions of the displacer relative to the housing.

2. The valve according to claim 1 wherein the damping chamber is defined by a cup-shaped end portion of the housing.

3. The valve according to claim 1, wherein the displacer is sealed off from the damping chamber.

4. The valve according to claim 1, wherein the valve member is movable axially of the housing and is supported by a slide, the slide forming a structural unit with the displacer.

5. The valve according to claim 1, wherein the portion of the housing forming the damping chamber has a stepped inner contour, a surface of which forms a guide surface for the displacer.

6. The valve according to claim 1, wherein the catch elements include radially movable members that engage in the countercatch elements.

7. The valve according to claim 6, wherein the catch elements are radially deflectable fingers separated by slots and unitary with the displacer.

8. The valve according to claim 1, wherein the displacer is biased by a locking spring received within the damping chamber.

9. The valve according to claim 1, wherein the valve member includes a slide which forms with the housing a back-pressure region of the fluid connection, the back-pressure region being sealed off by a valve seal that is supported by the slide and is radially movable relative to the valve seat in the housing.

10. The valve according to claim 9, wherein valve seal in the closed position is held in a groove in the valve seat, the seal being in spaced apart relation to a bottom surface of the groove.

11. The valve according to claim 9, wherein the back-pressure region has a pressure-equalizing connection which, upon movement of the valve slide into the back-pressure region, relieves the pressure in the fluid.

12. The valve according to claim 11 wherein the pressure-equalizing connection is arranged in the valve slide.

13. The valve according to claim 11, wherein the back-pressure region has an additional pressure-equalizing connection which is controlled by a sealing unit that seals off the housing of the valve, wherein the housing separates two working spaces from one another and in operation of the valve is moved axially, and wherein the sealing unit has a first outer sealing ring that is designed for low friction and an inner sealing ring that preloads the outer ring radially and, as a function of its position within an annular groove in the housing, controls the additional pressure-equalizing connection.

14. The valve according to claim 11, wherein the back-pressure region has an additional pressure-equalizing connection in the valve slide which, independently of other pressure-equalizing connections, connects the back-pressure region with a working space.

* * * * *

UNITED STATES PATENT AND TRADEMARK OFFICE
CERTIFICATE OF CORRECTION

PATENT NO.    : 6,202,979 B1
DATED         : March 20, 2001
INVENTOR(S)   : Wolfgang et al.

It is certified that error appears in the above-identified patent and that said Letters Patent is hereby corrected as shown below:

Title page,
Item [54] Title, "VALVE" should read -- VALVE WITH A DAMPING ARRANGEMENT --

Drawings,
Figs. 2b, 2c and 2d , "$A_{Ventilschieber}$" should read -- $A_{Valve\ slides}$ --

Column 8, claim 10,
Line 64, "valve seal" should read -- *the* valve seal --

Column 1,
Line 1, "VALVE" should read -- VALVE WITH A DAMPING ARRANGEMENT --
Line 66, "catch" should read -- a catch --

Column 2,
Line 59, "cross section;" should read -- cross section; and --

Column 3,
Line 18, "with-" should read -- with --

Column 4,
Line 52, "$A_{Ventilschieber}$" should read -- $A_{Valve\ slides}$ --
Line 53, "$A_{Ventilschieber}$" should read -- $A_{Valve\ slides}$ --

Column 6,
Line 5, "$A_{Ventilschieber}$" should read -- $A_{Valve\ slides}$ --

UNITED STATES PATENT AND TRADEMARK OFFICE
CERTIFICATE OF CORRECTION

PATENT NO.     : 6,202,979 B1
DATED          : March 20, 2001
INVENTOR(S)    : Wolfgang et al.

It is certified that error appears in the above-identified patent and that said Letters Patent is hereby corrected as shown below:

<u>Column 7,</u>
Line 31, "2a" should read -- Fig. 2a --

Signed and Sealed this

Second Day of April, 2002

Attest:

JAMES E. ROGAN
*Attesting Officer*   *Director of the United States Patent and Trademark Office*